(12) United States Patent
Magome et al.

(10) Patent No.: US 11,705,154 B2
(45) Date of Patent: Jul. 18, 2023

(54) MANUFACTURING METHOD OF MAGNETIC DISK DEVICE AND MAGNETIC DISK DEVICE

(71) Applicants: Kabushiki Kaisha Toshiba, Tokyo (JP); Toshiba Electronic Devices & Storage Corporation, Tokyo (JP)

(72) Inventors: Takahiro Magome, Yokohama Kanagawa (JP); Satoshi Yamashita, Yokohama Kanagawa (JP); Takahiro Aoki, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/695,579

(22) Filed: Mar. 15, 2022

(65) Prior Publication Data

US 2023/0088258 A1 Mar. 23, 2023

(30) Foreign Application Priority Data

Sep. 21, 2021 (JP) ................................. 2021-153431

(51) Int. Cl.
G11B 5/596 (2006.01)
G11B 5/84 (2006.01)
G11B 5/60 (2006.01)

(52) U.S. Cl.
CPC ...... *G11B 5/59661* (2013.01); *G11B 5/59666* (2013.01); *G11B 5/6029* (2013.01); *G11B 5/84* (2013.01)

(58) Field of Classification Search
None
See application file for complete search history.

(56) References Cited

U.S. PATENT DOCUMENTS

| 7,719,785 B2 | 5/2010 | Taniguchi et al. |
| 8,004,787 B2 * | 8/2011 | Cho ................... G11B 5/59638 360/75 |
| 8,018,673 B2 | 9/2011 | Saikawa et al. |

\* cited by examiner

*Primary Examiner* — K. Wong
(74) *Attorney, Agent, or Firm* — Allen & Overy LLP

(57) ABSTRACT

According to an embodiment, a manufacturing method includes: estimating a distribution of an initial value of a clearance of a magnetic head on a first recording surface; and recording first spiral signals on the first recording surface while controlling a clearance using the distribution of the initial value of the estimated clearance. The manufacturing method includes measuring a distribution of an initial value of a clearance of a magnetic head on a second recording surface under positioning control using the first spiral signals recorded on the first recording surface. The manufacturing method includes recording the first spiral signals on the second recording surface while controlling a clearance using the distribution of the initial value of the measured clearance of the magnetic head on the second recording surface. The manufacturing method includes recording the second spiral signals on a third recording surface under positioning control using the first spiral signals recorded on the second recording surface.

20 Claims, 8 Drawing Sheets

ROTATION DIRECTION

ROTATION DIRECTION

MANUFACTURING METHOD OF MAGNETIC DISK DEVICE AND MAGNETIC DISK DEVICE

CROSS-REFERENCE TO RELATED APPLICATIONS

This application is based upon and claims the benefit of priority from Japanese Patent Application No. 2021-153431, filed on Sep. 21, 2021; the entire contents of which are incorporated herein by reference.

FIELD

Embodiments described herein relate generally to a manufacturing method of a magnetic disk device and a magnetic disk device.

BACKGROUND

In the manufacturing process of the magnetic disk device, after the magnetic disk is assembled to the magnetic disk device, the magnetic disk device records the product servo pattern on the magnetic disk with reference to the auxiliary servo pattern. Such a process in which the product servo pattern is recorded on the magnetic disk by the magnetic disk device itself is known as self servo writing (SSW).

In a process prior to SSW, an auxiliary servo pattern is recorded on a blank magnetic disk. Similarly to the product servo pattern, the recording of the auxiliary servo pattern may be executed by the magnetic disk device itself. The process in which the magnetic disk device itself records the auxiliary servo pattern on a blank magnetic disk is referred to as blank disk self servo writing (BDSSW).

DETAILED DESCRIPTION

The manufacturing method of a magnetic disk device according to the present embodiment is a manufacturing method including a plurality of magnetic disks integrally rotated, the plurality of magnetic disks having a plurality of recording surfaces, and a plurality of magnetic heads corresponding to the plurality of recording surfaces integrally moved in a radial direction of the plurality of magnetic disks. The manufacturing method includes measuring an initial value of a clearance at a first position between a blank first recording surface among the plurality of recording surfaces and a first magnetic head corresponding to the first recording surface among the plurality of magnetic heads. The manufacturing method further includes estimating a first distribution that is a distribution in the radial direction of a initial value of a clearance between the first recording surface and the first magnetic head based on the measured initial value of the clearance at the first position of the first recording surface. The manufacturing method further includes recording a plurality of first spiral signals on the first recording surface by using the first magnetic head while controlling the clearance between the first recording surface and the first magnetic head by using first data that is the estimated first distribution. The manufacturing method further includes measuring a second distribution that is a distribution in the radial direction of an initial value of a clearance between a blank second recording surface different from the first recording surface among the plurality of recording surfaces and a second magnetic head corresponding to the second recording surface among the plurality of magnetic heads under positioning control using the plurality of first spiral signals recorded on the first recording surface. The manufacturing method further includes recording the plurality of first spiral signals on the second recording surface using the second magnetic head while controlling a clearance between the second recording surface and the second magnetic head using the measured second distribution. The manufacturing method further includes recording a plurality of second spiral signals on a third surface different from any of the first recording surface and the second recording surface among the plurality of recording surfaces using a third magnetic head corresponding to the third recording surface among the plurality of magnetic heads under positioning control using the plurality of first spiral signals recorded on the second recording surface.

Hereinafter, the manufacturing method of a magnetic disk device and the magnetic disk device according to an embodiment will be described in detail with reference to the accompanying drawings. Note that the present invention is not limited by this embodiment.

Embodiment

Figure 1:
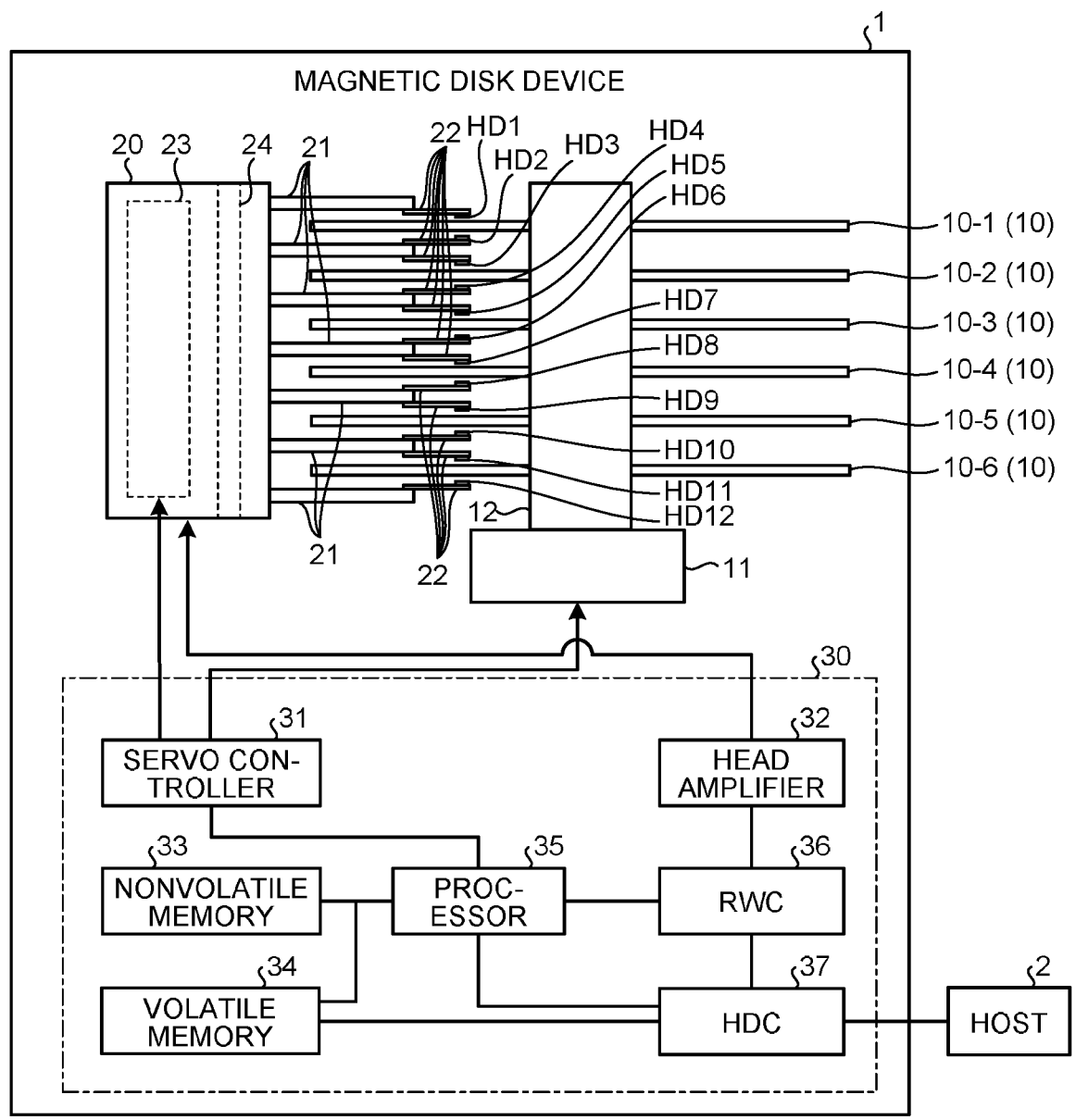
FIG. 1 is a diagram illustrating an example of a configuration of a magnetic disk device according to an embodiment.

FIG. 1 is a diagram illustrating an example of a configuration of a magnetic disk device 1 according to an embodiment. The magnetic disk device 1 is connectable to a host 2. The standard of the communication path between the magnetic disk device 1 and the host 2 is not limited to a specific standard. In one example, serial attached SCSI (SAS) may be adopted.

The host 2 corresponds to, for example, a processor, a personal computer, a server, or the like. The magnetic disk device 1 can receive an access command (a read command and a write command) from the host 2.

The magnetic disk device 1 includes a plurality of magnetic disks 10 that rotates about a rotation shaft 12 of a spindle motor (SPM) 11. Here, as an example, the magnetic disk device 1 includes six magnetic disks 10-1, 10-2, 10-3, 10-4, 10-5, and 10-6. The six magnetic disks 10-1, 10-2, 10-3, 10-4, 10-5, and 10-6 are integrally rotated by the SPM 11.

A recording surface capable of recording data is formed on the front surface and the back surface of the six magnetic disks 10. That is, the six magnetic disks 10 have twelve recording surfaces. In order to access each of the twelve recording surfaces, the magnetic disk device 1 includes twelve magnetic heads HD1 to HD12 corresponding to the twelve recording surfaces.

The magnetic head HD1 is provided to face the front surface of the magnetic disk 10-1. The magnetic head HD2 is provided to face the back surface of the magnetic disk 10-1. The magnetic head HD3 is provided to face the front surface of the magnetic disk 10-2. The magnetic head HD4 is provided to face the back surface of the magnetic disk 10-2. The magnetic head HD5 is provided to face the front surface of the magnetic disk 10-3. The magnetic head HD6 is provided to face the back surface of the magnetic disk 10-3. The magnetic head HD7 is provided to face the front surface of the magnetic disk 10-4. The magnetic head HD8 is provided to face the back surface of the magnetic disk 10-4. The magnetic head HD9 is provided to face the front surface of the magnetic disk 10-5. The magnetic head HD10 is provided to face the back surface of the magnetic disk 10-5. The magnetic head HD11 is provided to face the front surface of the magnetic disk 10-6. The magnetic head HD12 is provided to face the back surface of the magnetic disk 10-6.

Hereinafter, the twelve magnetic heads HD1 to HD12 may be collectively referred to as the magnetic heads HD. Each magnetic head HD can execute access, that is, data recording and data reproduction, with respect to the recording surface provided on the surface facing itself of the six magnetic disks 10.

The magnetic disk device 1 includes an actuator system 20 that integrally moves the twelve magnetic heads HD. The actuator system 20 includes seven actuator arms 21, twelve suspensions 22, and a voice coil motor (VCM) 23. Each of the twelve suspensions 22 included in the actuator system 20 supports any one of the magnetic heads HD1 to HD12. Each of the twelve suspensions 22 included in the actuator system 20 is attached to a distal end of any one of the seven actuator arms 21.

The actuator system 20 is rotatable about a rotation shaft 24. The rotation shaft 24 is provided at a position parallel to the rotation shaft 12 and separated from the rotation shaft 12. The VCM 23 can rotate the actuator system 20 within a predetermined range about the rotation shaft 24. Therefore, the actuator system 20 can move the magnetic heads HD1 to HD12 relative to the recording surfaces of the magnetic disks 10-1 to 10-6 in the radial direction.

Figure 2:
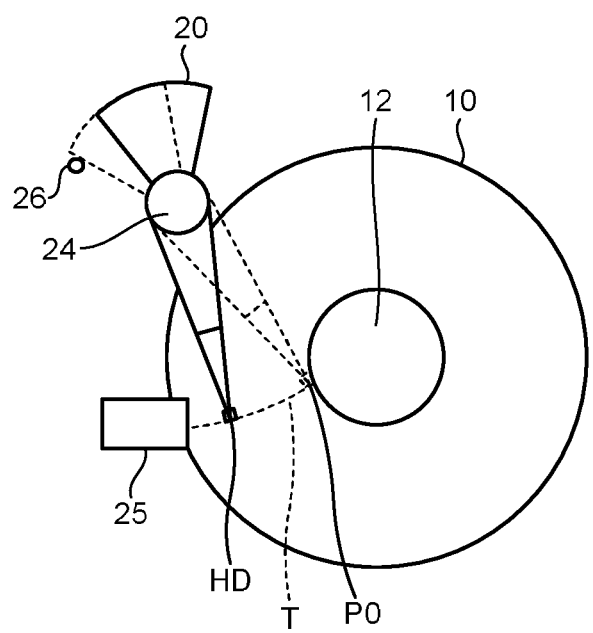
FIG. 2 is a diagram for describing a positional relationship between an actuator system and a magnetic disk according to the embodiment.

FIG. 2 is a diagram for describing a positional relationship between the actuator system 20 and the magnetic disk 10 according to the embodiment; As illustrated in the drawing, the actuator system 20 can relatively move the magnetic heads HD along a trajectory T with respect to the recording surfaces of the magnetic disks 10. The magnetic disk device 1 is provided with a ramp load mechanism 25 for parking each magnetic head HD on the trajectory T near the outer ends of the magnetic disks 10. In addition, the magnetic disk device 1 is provided with a stopper 26 that restricts the magnetic heads HD from moving in the inner circumferential direction of the magnetic disks 10 more than necessary. More specifically, when the magnetic head HD is at a position P0, the actuator system 20 abuts on the stopper 26, restricting the movement of the magnetic heads HD to the inner circumferential side of the position P0. Therefore, the magnetic heads HD are movable in a range from the ramp load mechanism 25 to the position P0. Note that the position P0 is an example of the first position.

The magnetic disk device 1 further includes a servo controller 31, a head amplifier 32, a nonvolatile memory 33, a volatile memory 34, a processor 35, a read/write channel (RWC) 36, and a hard disk controller (HDC) 37.

The head amplifier 32 supplies a signal corresponding to the write data input from the RWC 36 to the magnetic heads HD facing the recording surfaces to be written. In addition, the head amplifier 32 amplifies a signal output from the magnetic heads HD facing the recording surfaces to be read, and supplies the amplified signal to the RWC 36.

The nonvolatile memory 33 includes, for example, a nonvolatile memory such as a flash memory. A program executed by the processor 35 is recorded in the nonvolatile memory 33.

The volatile memory 34 includes a volatile memory such as a dynamic random access memory (DRAM) or a static random access memory (SRAM). The volatile memory 34 is provided with an area in which write data received from the host 2 and before being written to the magnetic disks 10 and read data read from the magnetic disks 10 and before being sent to the host 2 are buffered.

The RWC 36 modulates write data buffered in the volatile memory 34 and outputs the write data to the head amplifier 32. In addition, the RWC 36 demodulates the signal supplied from the head amplifier 32 and outputs the demodulated signal to the HDC 37.

The HDC 37 is a communication interface that enables communication with the host 2. Specifically, in a case where a write command is received from the host 2, the HDC 37 stores the write data in the volatile memory 34, and returns a response to the host 2 when the writing of the write data to the magnetic disk 10 is completed. In addition, in a case where the HDC 37 receives a read command from the host 2, data (read data) requested to be read by the read command is read from the magnetic disks 10 and buffered in the volatile memory 34, and then the read data buffered in the volatile memory 34 is returned to the host 2.

The servo controller 31 supplies current or voltage to the spindle motor that rotates the SPM 11 to rotate the spindle motor at a predetermined speed.

In addition, the servo controller 31 drives the VCM 23 to move the magnetic heads HD to a position designated by the processor 35.

The processor 35 is, for example, a central processing unit (CPU). The processor 35 executes various types of processing by a program stored in a nonvolatile storage medium such as the nonvolatile memory 33 or the magnetic disks 10.

For example, the processor 35 executes control of data writing and data reading by the magnetic heads HD, processing of determining an access position on the recording surfaces of the magnetic disks 10, processing of instructing the servo controller 31 on the access position, and the like.

The servo controller 31, the head amplifier 32, the nonvolatile memory 33, the volatile memory 34, the processor 35, the RWC 36, and the HDC 37 constitute a controller 30 according to the embodiment. Note that the components of the controller 30 are not limited to these.

Next, an example of details of the configuration of each magnetic head HD will be described. Each magnetic head HD is configured to be able to adjust a clearance between the magnetic head HD and the surface of the magnetic disk 10 facing the magnetic head HD. The clearance between the magnetic head HD and the surface of the magnetic disk 10 facing the magnetic head HD is also referred to as flying height. The lower the flying height, the higher the quality of the writing. A technique for controlling the flying height in a manner that the flying height becomes as small as possible is called a dynamic flying height (DFH) technique.

The assembling accuracy of the magnetic heads HD may vary for each magnetic head HD. In addition, the state (for example, unevenness or the like) of the surface of the magnetic disks 10 may vary for each magnetic disk 10 and for each radial position of the magnetic disks 10. Therefore, in a state in which the six magnetic disks 10 and the twelve magnetic heads HD are assembled, the clearance between the magnetic heads HD and the corresponding recording surfaces differs for each magnetic head HD, and also differs depending on the radial position in one recording surface.

In order to accurately control the flying height of the magnetic heads HD, it is necessary to acquire a clearance in a state in which the flying height is not controlled. The clearance in a state in which the control of the flying height is not performed is described as an initial value of the clearance (or the flying height). The initial value of the clearance is acquired, for example, by detecting a state in which the magnetic heads HD are in contact with the surfaces of the magnetic disks 10. The state in which the magnetic heads HD are in contact with the surfaces of the magnetic disks 10 is referred to as touchdown.

Figure 3:
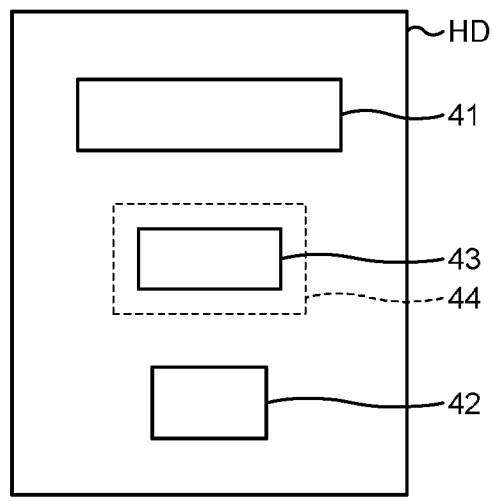
FIG. 3 is a diagram illustrating a configuration of each magnetic head according to the embodiment as viewed from a recording surface side of the magnetic disks.
Figure 4:
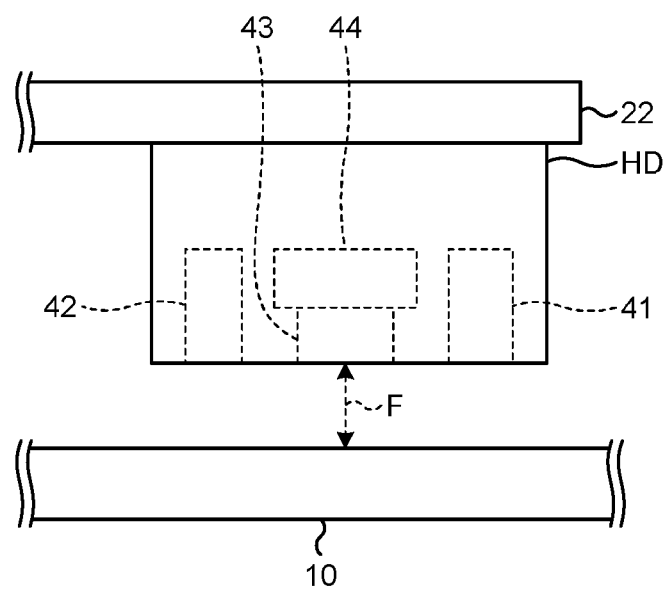
FIG. 4 is a cross-sectional view of each magnetic head according to the embodiment taken along an extending direction of a suspension.

An example of a configuration of each magnetic head HD for enabling control of the flying height will be described with reference to FIGS. 3 and 4. FIG. 3 is a diagram illustrating a configuration of each magnetic head HD according to the embodiment as viewed from a recording surface side of the magnetic disks 10. FIG. 4 is a cross-sectional view of each magnetic head HD according to the embodiment taken along an extending direction of the suspension 22.

As illustrated in FIGS. 3 and 4, the magnetic head HD includes a write element 41, a read element 42, a head-disk interface (HDI) sensor 43, and a heater 44.

The write element 41 records data on the recording surfaces of the magnetic disks 10 by a magnetic field generated from the magnetic pole. The read element 42 reads a change in the magnetic field on the magnetic disks 10 as data, reproducing data recorded on the magnetic disks 10.

Note that, according to the example illustrated in FIGS. 3 and 4, one write element 41 and one read element 42 are provided in one magnetic head HD. Any one or both of the write element 41 and the read element 42 may be provided in one magnetic head HD.

The heater 44 heats the magnetic head HD by power supplied from the head amplifier 32. Since the magnetic head HD is thermally deformed by this heating, a flying height F of the magnetic head HD from the magnetic disk 10 changes. More specifically, as the amount of power supplied to the heater 44 increases, the magnetic head HD thermally expands more greatly, and the flying height F decreases.

The HDI sensor 43 includes a resistance element (not illustrated). With this resistance element, it is possible to detect contact between the magnetic head HD and the recording surface of the magnetic disk 10, that is, touchdown. More specifically, when the magnetic head HD comes into contact with the magnetic disk 10, the HDI sensor 43 thermally changes due to the influence of frictional heat at the time of contact between the magnetic head HD and the magnetic disk 10. As a result, the resistance value of the resistance element changes. When a change in the resistance value of the resistance element is detected by the head amplifier 32, contact between the magnetic head HD and the magnetic disk 10 is detected.

When touchdown is detected, the power supplied to the heater 44 is gradually increased under the control of the head amplifier 32 by the processor 35. The magnetic head HD expands in accordance with an increase in power supplied to the heater 44, and the flying height F decreases. Then, when the flying height F becomes zero, the head amplifier 32 detects contact between the magnetic head HD and the magnetic disk 10 by a change in the resistance value of the resistance element of the HDI sensor 43. That is, touchdown is detected. The processor 35 calculates the value of the flying height F in a state in which the power is not supplied to the heater 44 based on the power supplied to the heater 44 when the touchdown is detected. For example, the relationship between the power supplied to the heater 44 and the protrusion amount of the magnetic head HD is recorded in advance in a predetermined location (for example, the nonvolatile memory 33). The processor 35 calculates the protrusion amount of the magnetic head HD when the touchdown is detected based on the relationship, and stores the protrusion amount obtained by the calculation as the flying height F in a state in which the clearance is not controlled, that is, an initial value of the clearance. The processor 35 can control the flying height to a desired value based on the initial value of the clearance and the relationship between the power supplied to the heater 44 and the protrusion amount of the magnetic head HD. Hereinafter, the initial value of the clearance may be referred to as reference flying height.

When an end user uses the magnetic disk device 1, in the magnetic disk device 1, the controller 30 executes positioning of each magnetic head HD based on the product servo pattern recorded on each recording surface.

Figure 5:
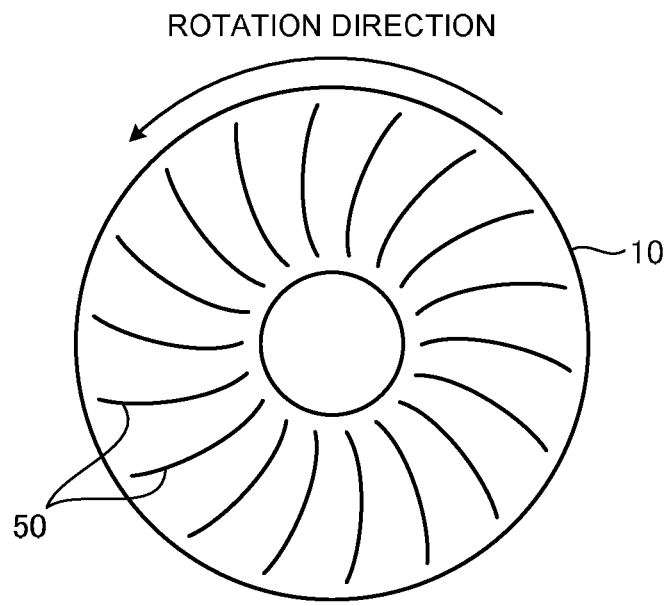
FIG. 5 is a schematic diagram illustrating an example of a shape of a product servo pattern recorded on the magnetic disk according to the embodiment.

FIG. 5 is a schematic diagram illustrating an example of a shape of a product servo pattern recorded on the magnetic disk 10 according to the embodiment. According to the example illustrated in this drawing, a product servo pattern 50 is recorded radially. The product servo pattern 50 includes sector/cylinder information and a burst pattern. The sector/cylinder information gives a servo address (servo sector address) in the circumferential direction of the magnetic disks 10 and a position (track number) of a track set in the radial direction. The track number obtained from the sector/cylinder information is an integer value, and the burst pattern represents an offset amount after the decimal point with reference to the track number. An area on the track where the product servo pattern 50 is recorded is used as an area where data may be recorded.

In the manufacturing process, the magnetic disk device 1 executes self servo writing. In the self servo writing, the magnetic disk device 1 records the product servo pattern 50 on the magnetic disks 10 with reference to the auxiliary servo pattern recorded in advance on the magnetic disks 10. That is, the controller 30 records the product servo pattern under the positioning control using the auxiliary servo pattern.

In the manufacturing process, the magnetic disk device 1 executes blank disk self servo writing for recording the auxiliary servo pattern by itself. In the blank disk self servo writing, the magnetic disk device 1 records the auxiliary servo pattern on at least one of the twelve recording surfaces. In the self servo writing, the magnetic disk device 1 records the product servo pattern 50 on all the twelve recording surfaces based on the auxiliary servo pattern recorded on at least one recording surface.

Figure 6:
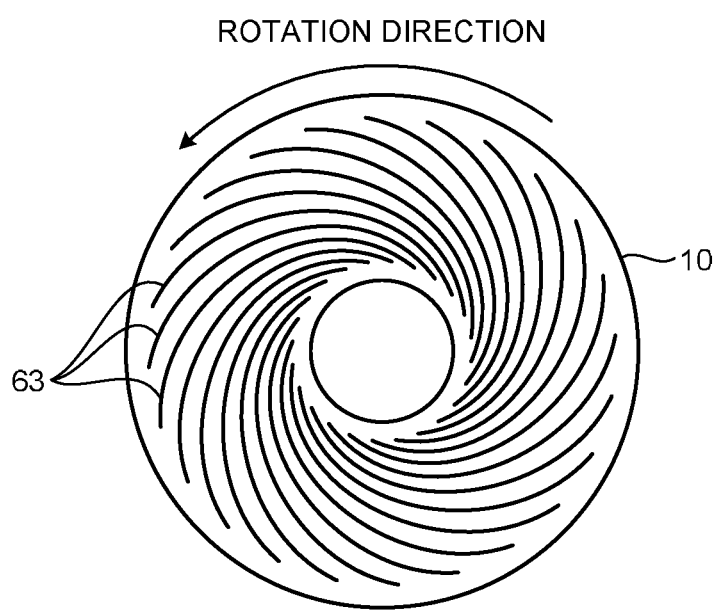
FIG. 6 is a schematic diagram illustrating an example of an auxiliary servo pattern recorded on the magnetic disk according to the embodiment.

FIG. 6 is a schematic diagram illustrating an example of an auxiliary servo pattern recorded on the magnetic disk 10 according to the embodiment. Note that, in the drawing, the rotation direction of the magnetic disk 10 is drawn. As illustrated in the drawing, the auxiliary servo pattern includes a plurality of spiral signals 63. The accuracy of positioning control in self servo writing increases as the number of spiral signals 63 constituting the auxiliary servo pattern increases. Therefore, in the blank disk self servo writing, the controller 30 is configured to record as many spiral signals 63 as possible.

However, it is difficult to accurately record a large number of spiral signals 63 at one time on the blank magnetic disk 10. If a large number of spiral signals 63 are recorded on the blank magnetic disk 10 at one time, the spiral signals 63 may be distorted or the interval between the spiral signals 63 in the circumferential direction of the magnetic disk 10 may be uneven. Therefore, the controller 30 records the auxiliary servo pattern in a plurality of stages. Here, as an example, the controller 30 records the auxiliary servo pattern in three stages of processing.

Figure 7:
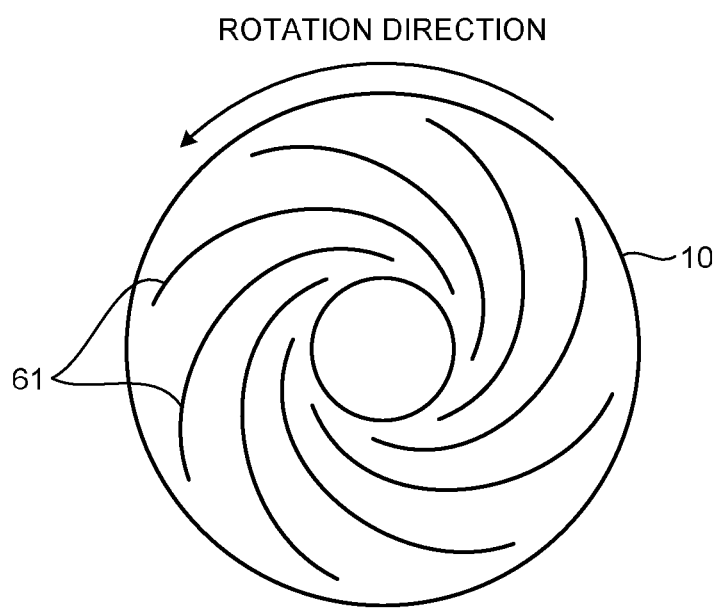
FIG. 7 is a schematic diagram illustrating an example of a plurality of first spiral signals recorded on a first spiral surface according to the embodiment.

Specifically, the controller 30 first records the plurality of first spiral signals on one of the twelve recording surfaces (hereinafter, referred to as a first spiral surface). FIG. 7 is a schematic diagram illustrating an example of a plurality of first spiral signals recorded on the first spiral surface according to the embodiment. As illustrated in this figure, the controller 30 first records a plurality of first spiral signals 61. In this example, eight first spiral signals 61 are recorded from the inner circumference to the outer circumference of the first spiral surface. The direction in which the first spiral signals 61 are recorded is not limited to the direction from the inner circumference toward the outer circumference. The first spiral signals 61 recorded on the first spiral surface is referred to as a first number. That is, in the example illustrated in FIG. 7, the first number is "8". The first number is not limited to "8".

Figure 8:
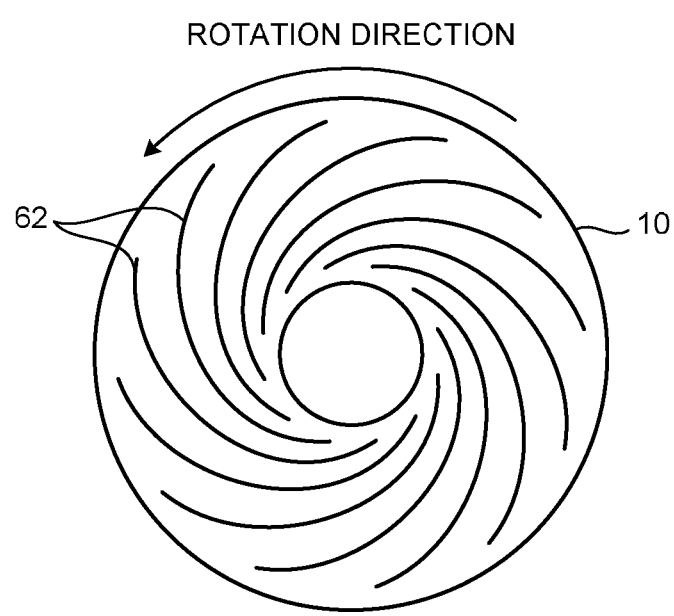
FIG. 8 is a schematic diagram illustrating an example of a second number of second spiral signals recorded on a second spiral surface according to the embodiment.

Next, the controller 30 records a second number of second spiral signals larger than the first number on another recording surface (referred to as a second spiral surface) different from the first spiral surface among the twelve recording surfaces while using the first number of first spiral signals 61 already recorded on the first spiral surface for positioning control. FIG. 8 is a schematic diagram illustrating an example of the second number of second spiral signals recorded on the second spiral surface according to the embodiment. In this example, twelve second spiral signals 62 are recorded from the outer circumference to the inner circumference of the second spiral surface. That is, in the example illustrated in FIG. 8, the second number is "12". The second number is not limited to "12". The direction in which the second spiral signals 62 are recorded is not limited to the direction from the outer circumference toward the inner circumference.

The controller 30 records the plurality of spiral signals 63 constituting the auxiliary servo pattern on a recording surface (referred to as a third spiral surface) different from both the first spiral surface and the second spiral surface among the twelve recording surfaces while using the second number of second spiral signals 62 already recorded on the second spiral surface for positioning control. Each of the plurality of spiral signals 63 constituting the auxiliary servo pattern is referred to as third spiral signals 63. The number of spiral signals 63 constituting the auxiliary servo pattern is larger than the second number. According to the example illustrated in FIG. 6, the number of spiral signals 63 constituting the auxiliary servo pattern is "24". The number of spiral signals 63 constituting the auxiliary servo pattern is not limited to "24". In the example illustrated in FIG. 6, each of the spiral signals 63 constituting the auxiliary servo pattern is recorded from the inner circumference toward the outer circumference. The direction in which each of the spiral signals 63 constituting the auxiliary servo pattern is recorded is not limited to the direction from the inner circumference toward the outer circumference. Hereinafter, the number of third spiral signals 63 constituting the auxiliary servo pattern is referred to as a third number.

In this manner, the controller 30 realizes accurate recording of the auxiliary servo pattern by gradually increasing the number of spiral signals to be recorded. The number of stages required to record the auxiliary servo pattern is not limited to three. The number of stages required to record the auxiliary servo pattern may be two or four or more.

As described above, the controller 30 is configured to be able to control the flying height of each magnetic head HD. By controlling the flying height to a relatively small value, the quality of the writing can be improved. In order to enable accurate control of the flying height, it is necessary to acquire the reference flying height (that is, an initial value of the clearance) by detection of touchdown. The acquisition of the reference flying height is also necessary at the time of the blank disk self servo writing.

Here, a technology (hereinafter, referred to as a comparative example) compared with the embodiment will be described. According to the comparative example, the touchdown is detected at the position P0 of the first spiral surface before the plurality of first spiral signals is recorded on the first spiral surface. Note that the position P0 is selected as the position where the touchdown is detected because the controller can position the magnetic head at the position P0 by bringing the actuator system into contact with the stopper, but cannot position the magnetic head at a position other than the position P0 when all the magnetic disks are blank. After the touchdown detection at the position P0 of the first spiral surface is executed, the reference flying height is estimated at a plurality of different positions in the radial direction of the first spiral surface based on the touchdown detection result. A reference flying height at a plurality of different positions in the radial direction is referred to as distribution of a reference flying height. In other words, a distribution of a reference flying height is a group (or a set) of reference flying heights at different positions in the radial direction. Note that the distribution of the reference flying height on the first spiral surface is estimated based on, for example, knowledge obtained in the past. After the estimation of the distribution of the reference flying height, the recording of the plurality of first spiral signals on the first spiral surface is executed while the flying height control using the distribution of the estimated reference flying height is performed. Then, under the positioning control using the plurality of first spiral signals recorded on the first spiral surface, the plurality of second spiral signals is recorded on the second spiral surface.

However, the distribution of the estimated reference flying height may deviate from the distribution of the actual reference flying height. In such a case, the quality of the plurality of first spiral signals recorded on the first spiral surface is poor. When the quality of the plurality of recorded first spiral signals is poor, untracking may occur when the second spiral signals are recorded on the second spiral surface under the positioning control using the plurality of first spiral signals. That is, while the second spiral signals are being recorded, the magnetic head deviates from the target position. When untracking occurs, recording of the plurality of second spiral signals is executed again.

As described above, according to the comparative example, the recording of the plurality of second spiral signals may be executed again due to the deterioration in quality of the plurality of first spiral signals. This may increase the time required for the blank disk self servo writing. That is, the efficiency of recording the auxiliary servo pattern is poor.

On the other hand, according to the embodiment, the controller 30 is configured to be able to measure the distribution of the reference flying height on the first spiral surface and record the plurality of first spiral signals on the first spiral surface while executing the flying height control using the measurement distribution of the reference flying height on the first spiral surface.

More specifically, the first spiral surface #1 and a first spiral surface #2 are set. Then, the controller 30 estimates the distribution of the reference flying height on the first spiral surface #1 in the same procedure as in the comparative example, and records the first spiral signals 61 on the first spiral surface #1 while performing the flying height control using the estimated distribution of the reference flying height. Then, the controller 30 measures the distribution of the reference flying height on the first spiral surface #2 under the positioning control using the first spiral signals 61 recorded on the first spiral surface #1. The controller 30 measures the distribution of the reference flying height by detecting touchdown at a plurality of different radial positions. The controller 30 records the plurality of first spiral signals 61 on the first spiral surface #2 while executing the flying height control using the measurement distribution of the reference flying height of the first spiral surface #2. Under the positioning control using the plurality of first spiral signals 61 recorded on the first spiral surface #2, the controller 30 records the plurality of second spiral signals 62 on the second spiral surface.

The recording of the plurality of first spiral signals 61 on the first spiral surface #2 is executed based on the measurement distribution of the reference flying height. Therefore, the first spiral surface #2 in which the plurality of high-quality first spiral signals 61 is recorded can be obtained. Since the second spiral signals 62 are recorded under positioning control using the plurality of high-quality first spiral signals 61, occurrence of untracking at the time of recording of the second spiral signals 62 is suppressed. As a result, the efficiency of recording the auxiliary servo pattern can be improved as compared with the comparative example.

The first spiral surface #1, the first spiral surface #2, the second spiral surface, and the third spiral surface may be determined in advance, or the controller 30 may select four recording surfaces from twelve recording surfaces according to an arbitrary algorithm and set the four recording surfaces as the first spiral surface #1, the first spiral surface #2, the second spiral surface, and the third spiral surface.

Furthermore, for example, in order to suppress an adverse effect occurring between wirings for each magnetic head HD built in the head amplifier 32, the first spiral surface #1, the first spiral surface #2, the second spiral surface, and the third spiral surface are selected in a manner that the magnetic heads HD used for accessing these surfaces are not adjacent to each other. The method for selecting each spiral surface is not limited to this.

Note that the first spiral surface #1 is an example of a first recording surface. The first spiral surface #2 is an example of a second recording surface. The second spiral surface is an example of a third recording surface. The third spiral surface is an example of a fourth recording surface.

Next, the operation of the magnetic disk device 1 according to the embodiment will be described.

Figure 9:
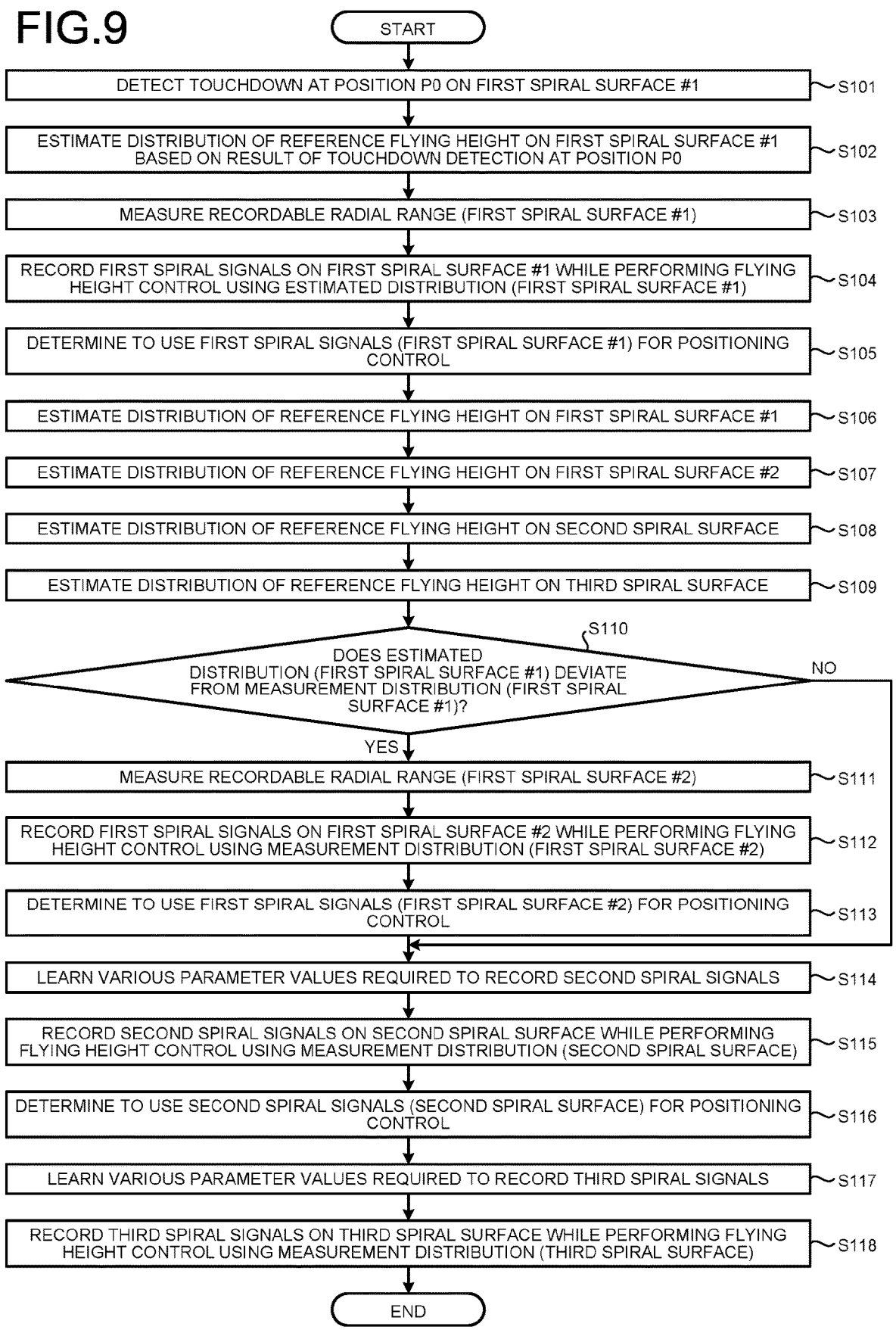
FIG. 9 is a flowchart illustrating an example of an operation of blank disk self servo writing executed by the magnetic disk device according to the embodiment.

FIG. 9 is a flowchart illustrating an example of an operation of blank disk self servo writing executed by the magnetic disk device 1 according to the embodiment. The control of the series of operations of the blank disk self servo writing illustrated in this drawing is realized, for example, by the processor 35 executing a program in the nonvolatile memory 33.

First, the controller 30 executes touchdown detection at the position P0 of the first spiral surface #1 (S101). That is, the controller 30 measures the reference flying height at the position P0 of the first spiral surface #1.

Specifically, the controller 30 causes the SPM 11 to integrally rotate the six magnetic disks 10, and causes the actuator system 20 to unload the twelve magnetic heads HD from the ramp load mechanism 25. Then, the controller 30 moves the twelve magnetic heads HD in the inner circumferential direction until the actuator system 20 abuts on the stopper 26. When the actuator system 20 abuts on the stopper 26, the magnetic head HD facing the first spiral surface #1 is located at the position P0. In a state in which the actuator system 20 is pressed against the stopper 26, the controller 30 controls the magnetic head HD facing the first spiral surface #1 to execute touchdown detection. As a result, the controller 30 obtains a measured value of the standard flying height at the position P0 of the first spiral surface #1.

Note that the magnetic head HD facing the first spiral surface #1 is an example of a first magnetic head.

Next, the controller 30 estimates the distribution of the reference flying height on the first spiral surface #1 based on the result of the touchdown detection at the position P0 (S102). Hereinafter, the distribution of the reference flying height obtained by the estimation is referred to as estimated distribution of the reference flying height.

Specifically, the controller 30 acquires the estimated distribution of the reference flying height based on the past knowledge. The manufacturer measures the distribution of the reference flying heights of a large number of other magnetic disk devices in advance, and acquires an average of the distribution of the reference flying heights of the large number of magnetic disk devices obtained by the measurement. The average of the distribution of the reference flying heights is stored in a predetermined position (for example, the nonvolatile memory 33) of the controller 30. The controller 30 estimates the distribution of the reference flying height based on the average of the distribution of the reference flying heights and the result of the touchdown detection at the position P0. For example, the controller 30 performs addition, subtraction, multiplication, division, or the like on the average of the distribution of the reference flying heights in a manner that the flying height at the position P0 indicated by the average of the distribution of the reference flying heights coincides with the measured value of the flying height at the position P0. The controller 30 acquires the estimated distribution of the reference flying height by these calculations. The method for acquiring the estimated distribution of the reference flying height is not limited to this. The controller 30 may be configured to acquire the estimated distribution of the reference flying height by substituting the reference flying height at the position P0 of the first spiral surface #1 into a predetermined arithmetic expression. In addition, the controller 30 may be configured to acquire the estimated distribution of the reference flying height by using an artificial intelligence (AI) model.

The estimated distribution of the reference flying height on the first spiral surface #1 is an example of first data.

Next, the controller 30 measures a recordable radial range with respect to the first spiral surface #1 (S103).

Specifically, the controller 30 moves the actuator system 20 from the movable limit on the outer circumferential side to the movable limit on the inner circumferential side (that is, the position where the actuator system abuts on the stopper 26) to measure the movable range of the magnetic head HD facing the first spiral surface #1. The controller 30 sets the measured movable range of the magnetic head HD facing the first spiral surface #1 as a recordable radial range.

Next, the controller 30 records the first number of first spiral signals 61 on the first spiral surface #1 while performing the flying height control using the estimated distribution of the reference flying height on the first spiral surface #1 (S104). The controller 30 records the first number of first spiral signals 61 in the recordable radial range obtained by the processing of S103.

When the recording of the first number of first spiral signals 61 on the first spiral surface #1 is completed, the controller 30 determines to use the first number of first spiral signals 61 recorded on the first spiral surface #1 for positioning control (S105).

Next, the controller 30 measures the distribution of the reference flying height on the first spiral surface #1 by executing touchdown detection at a plurality of positions on the first spiral surface #1 (S106). In S106, the controller 30 sequentially positions the magnetic head HD facing the first spiral surface #1 at a plurality of different positions (referred to as radial positions) in the radial direction based on the first number of first spiral signals 61 recorded on the first spiral surface #1. Then, the controller 30 executes touchdown detection at each of the plurality of radial positions. As a result, the controller 30 can obtain the distribution of the reference flying height on the measured first spiral surface #1. The measurement distribution of the reference flying height is referred to as a measurement distribution of the reference flying height.

The measurement distribution of the reference flying height on the first spiral surface #1 is an example of second data.

Next, the controller 30 measures the distribution of the reference flying height on the first spiral surface #2 by executing touchdown detection at a plurality of radial positions on the first spiral surface #2 in the same procedure as in S106 (S107).

Next, the controller 30 measures the distribution of the reference flying height on the second spiral surface by executing touchdown detection at a plurality of radial positions on the second spiral surface in the same procedure as in S106 (S108).

Next, the controller 30 measures the distribution of the reference flying height on the third spiral surface by executing touchdown detection at a plurality of radial positions on the third spiral surface in the same procedure as in S106 (S109).

Next, the controller 30 determines whether or not the estimated distribution of the reference flying height on the first spiral surface #1 deviates from the measurement distribution of the reference flying height on the first spiral surface #1 (S110). Details of the processing of S110 will be described later.

When the estimated distribution of the reference flying height on the first spiral surface #1 deviates from the measurement distribution of the reference flying height on the first spiral surface #1 (S110: Yes), it can be considered that the quality of the first number of first spiral signals 61 recorded on the first spiral surface #1 is poor. Therefore, the controller 30 executes the recording of the first number of first spiral signals 61 on the first spiral surface #2 by the processing of S111 to S112.

In S111, the controller 30 measures a recordable radial range with respect to the first spiral surface #2 in the same procedure as in S103 (S111).

In S112, the controller 30 records the first number of first spiral signals 61 on the first spiral surface #2 while performing the flying height control using the measurement distribution of the reference flying height on the first spiral surface #2 (S112). The controller 30 records the first number of first spiral signals 61 in the recordable radial range obtained by the processing of S111 using the magnetic head HD facing the first spiral surface #2.

Note that the magnetic head HD facing the first spiral surface #2 is an example of a second magnetic head.

When the recording of the first number of first spiral signals 61 on the first spiral surface #2 is completed, the controller 30 determines to use the first number of first spiral signals 61 recorded on the first spiral surface #2 for positioning control (S113).

As described above, when the estimated distribution of the reference flying height on the first spiral surface #1 deviates from the measurement distribution of the reference flying height on the first spiral surface #1 (S110: Yes), the first number of first spiral signals 61 are recorded on the first spiral surface #2 while the flying height control using the measurement distribution of the reference flying height on the first spiral surface #2 is performed. Then, in the processing of S114 and S115 described later, positioning control using the first number of first spiral signals 61 recorded on the first spiral surface #2 is executed.

When the estimated distribution of the reference flying height on the first spiral surface #1 does not deviate from the measurement distribution of the reference flying height on the first spiral surface #1 (S110: No), it can be considered that the quality of the first number of first spiral signals 61 recorded on the first spiral surface #1 is sufficiently high. Therefore, the processing of S111 to S113 is skipped, and in the processing of S114 and S115 described later, positioning control using the first number of first spiral signals 61 recorded on the first spiral surface #1 is executed.

A case where the estimated distribution of the reference flying height on the first spiral surface #1 does not deviate from the measurement distribution of the reference flying height on the first spiral surface #1 (S110: No) is an example of a first case. A case where the estimated distribution of the reference flying height on the first spiral surface #1 deviates from the measurement distribution of the reference flying height on the first spiral surface #1 (S110: Yes) is an example of a second case where the deviation between the first data and the second data is larger than that in the first case.

In S114, the controller 30 learns values of various parameters required for recording the second number of second spiral signals 62 on the second spiral surface while moving the magnetic head HD facing the second spiral surface.

Then, in S115, the controller 30 records the second number of second spiral signals 62 on the second spiral surface while performing the flying height control using the measurement distribution of the reference flying height on the second spiral surface. The controller 30 records the second number of second spiral signals 62 using the magnetic head HD facing the second spiral surface.

Note that the magnetic head HD facing the second spiral surface is an example of a third magnetic head.

Subsequent to S115, the controller 30 determines to use the second number of second spiral signals 62 recorded on the second spiral surface for positioning control (S116). The controller 30 executes the processing of S117 and S118 under positioning control using the second number of second spiral signals 62 recorded on the second spiral surface.

In S117, the controller 30 learns values of various parameters required for recording the third number of third spiral signals 63 on the third spiral surface while moving the magnetic head HD facing the third spiral surface.

Then, in S118, the controller 30 records the third number of third spiral signals 63 on the third spiral surface while performing the flying height control using the measurement distribution of the reference flying height on the third spiral surface. The controller 30 records the third number of third spiral signals 63 using the magnetic head HD facing the third spiral surface.

Note that the magnetic head HD facing the third spiral surface is an example of a fourth magnetic head.

When the processing of S118 is completed, the operation of the blank disk self servo writing ends. In the self servo writing to be executed later, the controller 30 records the product servo pattern 50 on all the recording surfaces under the positioning control using the third number of third spiral signals 63 recorded on the third spiral surface.

Next, details of the processing of S110 will be described. In S110, the controller 30 compares the estimated distribution of the reference flying height on the first spiral surface #1 with the measurement distribution of the reference flying height on the first spiral surface #1.

Figure 10:
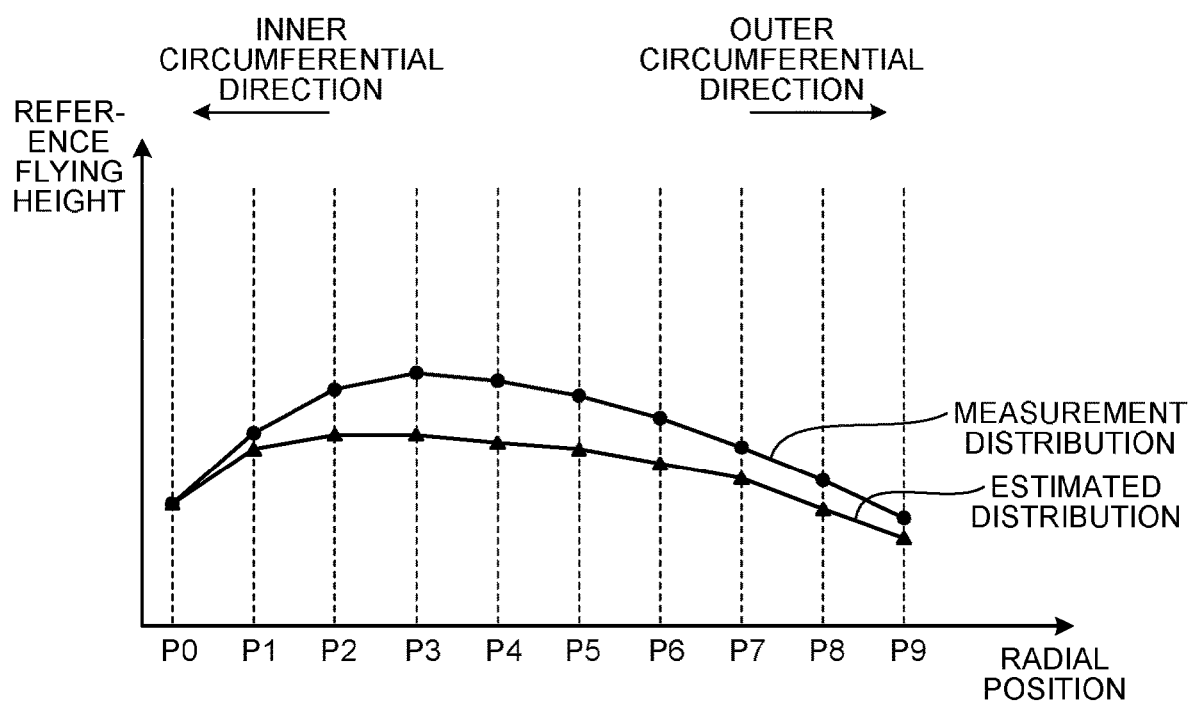
FIG. 10 is a schematic diagram illustrating an example of estimated distribution of reference flying height on a first spiral surface #1 and measurement distribution of reference flying height on the first spiral surface #1 acquired by a controller according to the embodiment.

FIG. 10 is a schematic diagram illustrating an example of estimated distribution of reference flying height on the first spiral surface #1 and measurement distribution of reference flying height on the first spiral surface #1 acquired by the controller 30 according to the embodiment.

In the example illustrated in FIG. 10, a total of ten radial positions P0, P1, P2, P3, P4, P5, P6, P7, P8, and P9 are set in this order from the inner circumferential side of the magnetic disks 10. The distribution (measurement distribution and estimated distribution) of the reference flying height is a set of estimated values or measured values of the reference flying height when the magnetic head HD is located at each of the radial positions P1 to P9. In other words, the distribution of the reference flying height (measurement distribution and estimated distribution) includes the reference flying height at the plurality of radial positions P1 to P9. A method for setting the radial position where the estimated value or the measured value of the reference flying height is acquired is arbitrary. The radial position where the estimated value or the measured value of the reference flying height is acquired may be set, for example, for each zone.

In the example illustrated in FIG. 10, the estimated distribution and the measurement distribution of the reference flying height on the first spiral surface #1 are different from each other except for the reference flying height at the position P0. In S110, the controller 30 compares the estimated value and the measured value of the reference flying height for each radial position.

Figure 11:
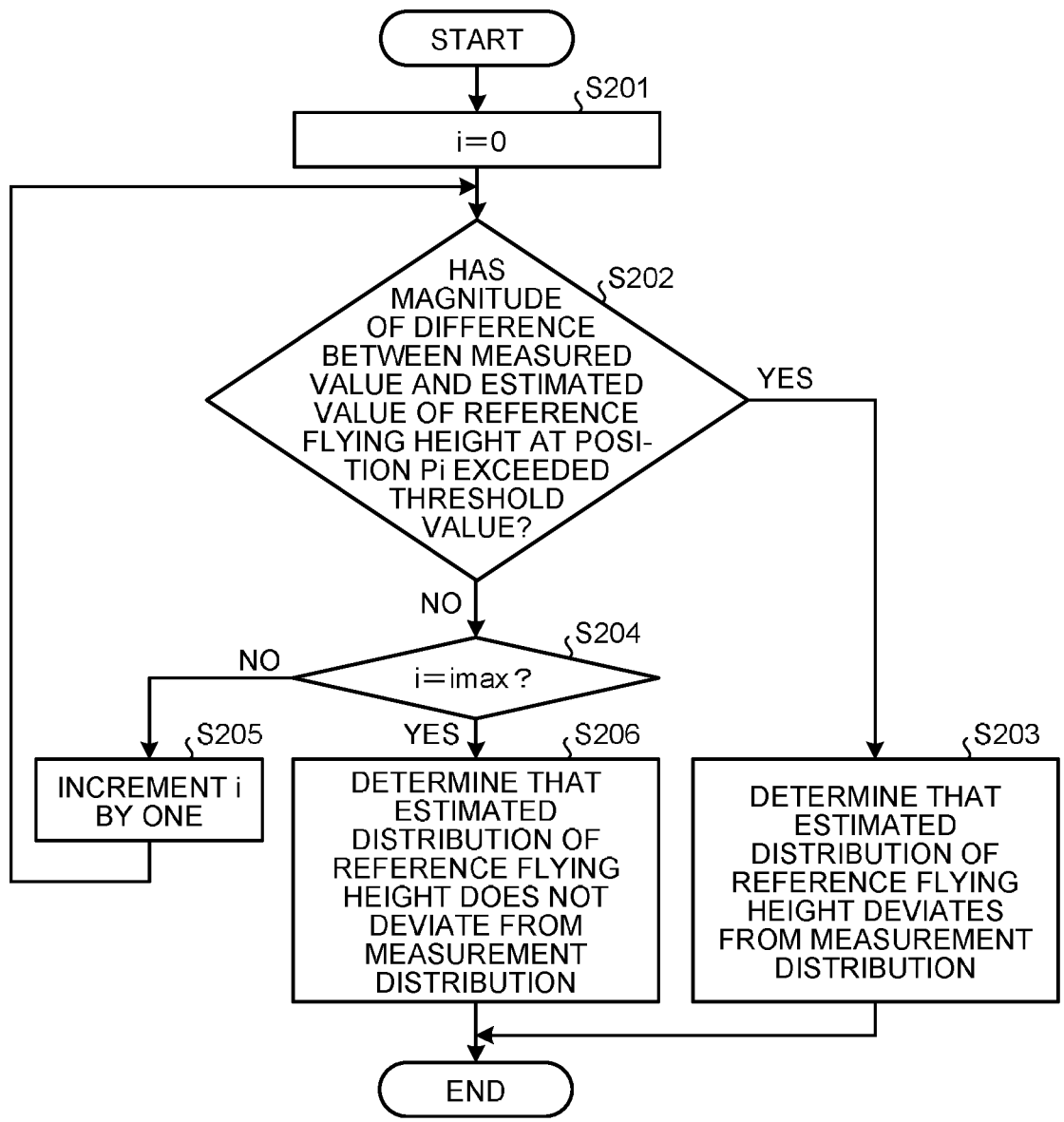
FIG. 11 is a flowchart illustrating an example of details of processing of S110 included in the blank disk self servo writing according to the embodiment.

FIG. 11 is a flowchart illustrating an example of details of processing of S110 included in the blank disk self servo writing according to the embodiment. In the description of the drawing, a position Px represents a radial position where the estimated value or the measured value of the reference flying height is acquired. The subscript "x" of Px is an integer from zero to imax. In the example illustrated in FIG. 10, imax is "9".

First, the controller 30 initializes the loop index i to "0" (S201). Then, the controller 30 determines whether or not the magnitude of the difference between the measured value and the estimated value of the reference flying height at a position Pi exceeds the threshold value (S202). As the threshold value, a positive value is set in advance. The threshold value is set in advance according to the degree of deviation allowed between the estimated distribution and the measurement distribution of the reference flying height.

When the magnitude of the difference between the measured value and the estimated value of the reference flying height at the position Pi exceeds the threshold value (S202: Yes), the controller 30 determines that the estimated distribution of the reference flying height deviates from the measurement distribution (S203), and the processing of S110 ends.

When the magnitude of the difference between the measured value and the estimated value of the reference flying height at the position Pi exceeds the threshold value (S202: Yes), the controller 30 determines whether or not i is equal to imax (S203). When i is not equal to imax (S204: No), the controller 30 increments i by one (S205), and executes the processing of S202 again.

When i is equal to imax (S204: Yes), the controller 30 determines that the estimated distribution of the reference flying height does not deviate from the measurement distribution (S206), and the processing of S110 ends.

In the example illustrated in FIG. 11, when the magnitude of the difference between the measured value and the estimated value of the reference flying height at the position Pi is equal to the threshold value, the controller 30 executes the processing of S204. The processing when the magnitude of the difference between the measured value and the estimated value of the reference flying height at the position Pi is equal to the threshold value is not limited to this. When the magnitude of the difference between the measured value and the estimated value of the reference flying height at the position Pi is equal to the threshold value, the controller 30 may execute the processing of S203.

In the example illustrated in FIG. 9, it is determined in S110 whether or not the estimated distribution of the reference flying height on the first spiral surface #1 deviates from the measurement distribution, and when it is determined that the estimated distribution of the reference flying height on the first spiral surface #1 does not deviate from the measurement distribution, the processing in S111 to S113 is skipped. The controller 30 may be configured such that the processing of S110 is eliminated and the processing of S111 to S113 are necessarily executed.

As described above, according to the embodiment, the controller 30 measures the reference flying height of the blank at the position P0 on the first spiral surface #1, and estimates the distribution of the reference flying height on the first spiral surface #1 based on the measured value of the reference flying height at the position P0 of the first spiral surface #1 (see, for example, S101 and S102 in FIG. 9). Then, the controller 30 records the plurality of first spiral signals 61 on the first spiral surface #1 while controlling the flying height of the magnetic head HD facing the first spiral surface #1 using the estimated distribution of the reference flying height on the first spiral surface #1 (see, for example, S104 in FIG. 9). Then, the controller 30 measures the distribution of the reference flying height of the blank on the first spiral surface #2 under the positioning control using the plurality of first spiral signals 61 recorded in the first spiral surface #1 (see, for example, S107 in FIG. 9). Then, the controller 30 records the plurality of first spiral signals 61 on the first spiral surface #2 while performing the flying height control using the measurement distribution of the reference flying height on the first spiral surface #2 (see, for example, S112 in FIG. 9). Then, the controller 30 records the plurality of second spiral signals 62 on the second spiral surface under the positioning control using the plurality of first spiral signals 61 recorded on the first spiral surface #2 (see, for example, S113 and S115 in FIG. 9).

Therefore, since the position control using the plurality of high-quality first spiral signals 61 can be executed, it is possible to suppress the occurrence of untracking at the time of recording the plurality of second spiral signals 62. As a result, the auxiliary servo pattern can be efficiently recorded.

According to the embodiment, the controller 30 measures the distribution of the reference flying height on the first spiral surface #1 under the positioning control using the plurality of first spiral signals 61 recorded on the first spiral surface #1 (see, for example, S106 in FIG. 9). Then, the controller 30 compares the estimated distribution and the measurement distribution of the reference flying height on the first spiral surface #1 (see, for example, S110 in FIG. 9 and FIG. 11). Then, when the estimated distribution of the reference flying height on the first spiral surface #1 does not deviate from the measurement distribution, the controller 30 records the plurality of second spiral signals 62 on the second spiral surface under the positioning control using the plurality of first spiral signals 61 recorded on the first spiral surface #1 (see, for example, S115 when No is determined in S110 in FIG. 9). When the estimated distribution of the reference flying height on the first spiral surface #1 deviates from the measurement distribution, the controller 30 records the plurality of first spiral signals 61 on the first spiral surface #2, and records the plurality of second spiral signals 62 on the second spiral surface under positioning control using the plurality of first spiral signals 61 recorded on the first spiral surface #2 (see, for example, S112, S113, and S115 when Yes is determined in S110 in FIG. 9).

When the estimated distribution of the reference flying height on the first spiral surface #1 does not deviate from the measurement distribution, it can be considered that the quality of the plurality of first spiral signals 61 recorded on the first spiral surface #1 is high. In such a case, the plurality of second spiral signals 62 is recorded on the second spiral surface under the positioning control using the plurality of first spiral signals 61 recorded on the first spiral surface #1. Therefore, at the time of recording the plurality of second spiral signals 62, the occurrence of untracking can be suppressed. As a result, the auxiliary servo pattern can be efficiently recorded.

In addition, according to the embodiment, the controller 30 calculates the difference between the estimated value and the measured value of the reference flying height on the first spiral surface #1 for each radial position. When all the differences for each radial position are less than the threshold value, the controller 30 determines that the estimated distribution of the reference flying height on the first spiral surface #1 does not deviate from the measurement distribution. When at least one of all the differences for each radial position exceeds the threshold value, the controller 30 determines that the estimated distribution of the reference flying height on the first spiral surface #1 deviates from the measurement distribution (for example, see FIG. 11).

When at least one estimated value with poor accuracy is included in the estimated distribution of the reference flying height on the first spiral surface #1, the controller 30 re-executes the recording of the plurality of first spiral signals 61 while performing the flying height control using the measurement distribution of the reference flying height on the first spiral surface #1. Therefore, at the time of recording the plurality of second spiral signals 62, the occurrence of untracking can be suppressed. As a result, the auxiliary servo pattern can be efficiently recorded.

In addition, according to the embodiment, the controller 30 measures the distribution of the reference flying height on the second spiral surface under the positioning control using the plurality of first spiral signals 61 recorded on the first spiral surface #1 (see, for example, S106 and S108 in FIG. 9). Then, the controller 30 records the plurality of second spiral signals 62 on the second spiral surface while performing the flying height control using the measurement distribution of the reference flying height on the second spiral surface (see, for example, S115 in FIG. 9).

Therefore, the quality of the plurality of second spiral signals 62 recorded on the second spiral surface can be improved.

As an example, the auxiliary servo pattern is recorded in three stages of processing. In such a case, the controller 30 records the plurality of third spiral signals 63 on the third spiral surface under the positioning control using the plurality of second spiral signals 62 recorded on the second spiral surface (see S116 and S118 in FIG. 9).

In addition, according to the embodiment, the plurality of first spiral signals 61 is the first number of first spiral signals 61, the plurality of second spiral signals 62 is the second number of second spiral signals 62, and the plurality of third spiral signals 63 is the third number of third spiral signals 63. The second number is larger than the first number, and the third number is larger than the second number. Note that the magnitude relationship among the first number, the second number, and the third number is arbitrary.

The operations described in FIGS. 9 and 11 were executed by the controller 30. The operations described in FIGS. 9 and 11 are executed by the controller 30 under the control of the processor 35 according to, for example, a predetermined program (for example, a program stored in advance in the nonvolatile memory 33). Specifically, the processor 35 controls the servo controller 31, the head amplifier 32, the nonvolatile memory 33, the volatile memory 34, the RWC 36, and the HDC 37 according to a program. As a result, the servo controller 31, the head amplifier 32, the nonvolatile memory 33, the volatile memory 34, the processor 35, the RWC 36, and the HDC 37 realize the operations illustrated in FIGS. 9 and 11.

Note that a part or all of the functions of the processor 35 may be realized by other components (for example, the servo controller 31, the head amplifier 32, the RWC 36, or the HDC 37) in the controller 30. A part or all of the functions of the processor 35 may be implemented by a hardware circuit such as a field-programmable gate array (FPGA) or an application specific integrated circuit (ASIC).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A manufacturing method of a magnetic disk device comprising a plurality of magnetic disks integrally rotated, the plurality of magnetic disks having a plurality of recording surfaces, and a plurality of magnetic heads corresponding to the plurality of recording surfaces integrally moved in a radial direction of the plurality of magnetic disks,
   wherein the manufacturing method includes
   measuring an initial value of a clearance at a first position between a blank first recording surface among the plurality of recording surfaces and a first magnetic head corresponding to the first recording surface among the plurality of magnetic heads,
   estimating a first distribution that is a distribution in the radial direction of an initial value of a clearance between the first recording surface and the first magnetic head based on the measured initial value of the clearance at the first position of the first recording surface,
   recording a plurality of first spiral signals on the first recording surface by using the first magnetic head while controlling a clearance between the first recording surface and the first magnetic head by using first data that is the estimated first distribution,
   measuring a second distribution that is a distribution in the radial direction of an initial value of a clearance between a blank second recording surface different from the first recording surface among the plurality of recording surfaces and a second magnetic head corresponding to the second recording surface among the plurality of magnetic heads under positioning control using the plurality of first spiral signals recorded on the first recording surface,
   recording the plurality of first spiral signals on the second recording surface using the second magnetic head while controlling a clearance between the second recording surface and the second magnetic head using the measured second distribution, and
   recording a plurality of second spiral signals on a third recording surface different from any of the first recording surface and the second recording surface among the plurality of recording surfaces using a third magnetic head corresponding to the third recording surface among the plurality of magnetic heads under positioning control using the plurality of first spiral signals recorded on the second recording surface.

2. The manufacturing method according to claim 1 further comprising:
   measuring the first distribution under the positioning control using the plurality of first spiral signals recorded on the first recording surface;
   comparing the first data with second data that is the measured first distribution; and
   in a first case, executing recording the plurality of second spiral signals on the third recording surface using the third magnetic head under the positioning control using the plurality of first spiral signals recorded on the first recording surface, and in a second case where a deviation between the first data and the second data is larger than the first case, executing recording the plurality of first spiral signals on the second recording surface, and recording the plurality of second spiral signals on the third recording surface under the positioning control using the plurality of first spiral signals recorded on the second recording surface.

3. The manufacturing method according to claim 2, wherein
   the first distribution includes initial values of clearances at a plurality of different radial positions,
   comparing the first data with the second data includes calculating a difference between an initial value of a clearance included in the first data and an initial value of a clearance included in the second data for each radial position, and
   the first case is a case where all of the differences for each radial position are less than a threshold value, and the second case is a case where at least one of the differences for each radial position exceeds the threshold value.

4. The manufacturing method according to claim 1 further comprising:
   measuring a third distribution that is a distribution in the radial direction of an initial value of a clearance between the third recording surface and the third magnetic head under the positioning control using the plurality of first spiral signals recorded on the first recording surface,
   wherein recording the plurality of second spiral signals on the third recording surface using the third magnetic head includes recording the plurality of second spiral signals while controlling the clearance between the third recording surface and the third magnetic head using the measured third distribution.

5. The manufacturing method according to claim 2 further comprising:
   measuring a third distribution that is a distribution in the radial direction of an initial value of a clearance between the third recording surface and the third magnetic head under the positioning control using the plurality of first spiral signals recorded on the first recording surface,
   wherein recording the plurality of second spiral signals on the third recording surface using the third magnetic head includes recording the plurality of second spiral signals while controlling the clearance between the third recording surface and the third magnetic head using the measured third distribution.

6. The manufacturing method according to claim 3 further comprising:
   measuring a third distribution that is a distribution in the radial direction of an initial value of a clearance between the third recording surface and the third magnetic head under the positioning control using the plurality of first spiral signals recorded on the first recording surface,
   wherein recording the plurality of second spiral signals on the third recording surface using the third magnetic head includes recording the plurality of second spiral signals while controlling the clearance between the third recording surface and the third magnetic head using the measured third distribution.

7. The manufacturing method according to claim 1 further comprising:
   recording a plurality of third spiral signals on a fourth recording surface different from any of the first recording surface, the second recording surface, and the third recording surface among the plurality of recording surfaces by using a fourth magnetic head corresponding to the fourth recording surface among the plurality of magnetic heads under positioning control using the plurality of second spiral signals recorded on the third recording surface.

8. The manufacturing method according to claim 2 further comprising:
recording a plurality of third spiral signals on a fourth recording surface different from any of the first recording surface, the second recording surface, and the third recording surface among the plurality of recording surfaces by using a fourth magnetic head corresponding to the fourth recording surface among the plurality of magnetic heads under positioning control using the plurality of second spiral signals recorded on the third recording surface.

9. The manufacturing method according to claim 3 further comprising:
recording a plurality of third spiral signals on a fourth recording surface different from any of the first recording surface, the second recording surface, and the third recording surface among the plurality of recording surfaces by using a fourth magnetic head corresponding to the fourth recording surface among the plurality of magnetic heads under positioning control using the plurality of second spiral signals recorded on the third recording surface.

10. The manufacturing method according to claim 4 further comprising:
recording a plurality of third spiral signals on a fourth recording surface different from any of the first recording surface, the second recording surface, and the third recording surface among the plurality of recording surfaces by using a fourth magnetic head corresponding to the fourth recording surface among the plurality of magnetic heads under positioning control using the plurality of second spiral signals recorded on the third recording surface.

11. The manufacturing method according to claim 5 further comprising:
recording a plurality of third spiral signals on a fourth recording surface different from any of the first recording surface, the second recording surface, and the third recording surface among the plurality of recording surfaces by using a fourth magnetic head corresponding to the fourth recording surface among the plurality of magnetic heads under positioning control using the plurality of second spiral signals recorded on the third recording surface.

12. The manufacturing method according to claim 6 further comprising:
recording a plurality of third spiral signals on a fourth recording surface different from any of the first recording surface, the second recording surface, and the third recording surface among the plurality of recording surfaces by using a fourth magnetic head corresponding to the fourth recording surface among the plurality of magnetic heads under positioning control using the plurality of second spiral signals recorded on the third recording surface.

13. The manufacturing method according to claim 1, wherein
the plurality of first spiral signals is a first number of first spiral signals,
the plurality of second spiral signals is a second number of second spiral signals, and
the second number is larger than the first number.

14. The manufacturing method according to claim 2, wherein
the plurality of first spiral signals is a first number of first spiral signals,
the plurality of second spiral signals is a second number of second spiral signals, and
the second number is larger than the first number.

15. The manufacturing method according to claim 3, wherein
the plurality of first spiral signals is a first number of first spiral signals,
the plurality of second spiral signals is a second number of second spiral signals, and
the second number is larger than the first number.

16. The manufacturing method according to claim 4, wherein
the plurality of first spiral signals is a first number of first spiral signals,
the plurality of second spiral signals is a second number of second spiral signals, and
the second number is larger than the first number.

17. The manufacturing method according to claim 7, wherein
the plurality of first spiral signals is a first number of first spiral signals,
the plurality of second spiral signals is a second number of second spiral signals, and
the second number is larger than the first number.

18. The manufacturing method according to claim 7, wherein
the plurality of first spiral signals is a first number of first spiral signals,
the plurality of second spiral signals is a second number of second spiral signals,
the plurality of third spiral signals is a third number of third spiral signals,
the second number is larger than the first number, and
the third number is larger than the second number.

19. A magnetic disk device comprising:
a plurality of magnetic disks integrally rotated and having a plurality of recording surfaces;
a plurality of magnetic heads corresponding to the plurality of recording surfaces;
an actuator system that integrally moves the plurality of magnetic heads in a radial direction of the plurality of magnetic disks; and
a controller configured to
measure an initial value of a clearance at a first position between a blank first recording surface among the plurality of recording surfaces and a first magnetic head corresponding to the first recording surface among the plurality of magnetic heads,
estimate a first distribution that is a distribution in the radial direction of an initial value of a clearance between the first recording surface and the first magnetic head based on the measured initial value of the clearance at the first position of the first recording surface,
record a plurality of first spiral signals on the first recording surface by using the first magnetic head while controlling a clearance between the first recording surface and the first magnetic head by using first data that is the estimated first distribution,
measure a second distribution that is a distribution in the radial direction of an initial value of a clearance between a second recording surface different from the first recording surface among the plurality of recording surfaces and a second magnetic head corresponding to the second recording surface among the plurality of magnetic heads under positioning control using the plurality of first spiral signals recorded on the first recording surface, record the plurality of first spiral signals on the second recording surface using the second magnetic head while controlling a clearance between the second recording surface and the second magnetic head using the measured second distribution, and record a plurality of second spiral signals on a third recording surface different from any of the first recording surface and the second recording surface among the plurality of recording surfaces using a third magnetic head corresponding to the third recording surface among the plurality of magnetic heads under positioning control using the plurality of first spiral signals recorded on the second recording surface.

20. The magnetic disk device according to claim 19 wherein, the controller is further configured to measure the first distribution under the positioning control using the plurality of first spiral signals recorded on the first recording surface, compare the first data with second data that is the measured first distribution, and in a first case, execute recording the plurality of second spiral signals on the third recording surface using the third magnetic head under the positioning control using the plurality of first spiral signals recorded on the first recording surface, and in a second case where a deviation between the first data and the second data is larger than the first case, execute recording the plurality of first spiral signals on the second recording surface, and recording the plurality of second spiral signals on the third recording surface under the positioning control using the plurality of first spiral signals recorded on the second recording surface.

* * * * *